United States Patent
Park et al.

(10) Patent No.: US 12,505,011 B2
(45) Date of Patent: Dec. 23, 2025

(54) MEMORY CONTROLLER AND MEMORY SYSTEM INCLUDING THE SAME

(71) Applicant: SAMSUNG ELECTRONICS CO., LTD., Suwon-si (KR)

(72) Inventors: Kyung Jin Park, Suwon-si (KR); Sung-Joon Kim, Suwon-si (KR); Ho-Young Lee, Suwon-si (KR); Kyung-Hee Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 18/376,637

(22) Filed: Oct. 4, 2023

(65) Prior Publication Data

US 2024/0202069 A1  Jun. 20, 2024

(30) Foreign Application Priority Data

Dec. 19, 2022  (KR) .......................... 10-2022-0178620

(51) Int. Cl.
*G06F 11/10* (2006.01)
*G06F 11/07* (2006.01)

(52) U.S. Cl.
CPC .......... *G06F 11/106* (2013.01); *G06F 11/076* (2013.01); *G06F 11/1068* (2013.01)

(58) Field of Classification Search
CPC ... G06F 11/106; G06F 11/076; G06F 11/1068
USPC ........................................................ 714/764
See application file for complete search history.

(56) References Cited

U.S. PATENT DOCUMENTS

| | | | |
|---|---|---|---|
| 8,060,774 B2 | 11/2011 | Smith et al. | |
| 8,255,772 B1 | 8/2012 | Foley | |
| 8,443,262 B2 * | 5/2013 | Foley | G11C 29/42 714/764 |
| 9,454,380 B2 | 9/2016 | Kumar et al. | |
| 9,535,782 B2 | 1/2017 | Agrawal et al. | |
| 10,521,294 B2 | 12/2019 | Bacchus | |
| 10,599,504 B1 | 3/2020 | BeSerra et al. | |
| 10,628,248 B2 * | 4/2020 | Chinnakkonda Vidyapoornachary | G06F 11/076 |
| 11,127,481 B1 * | 9/2021 | Lang | G11C 29/44 |
| 11,763,914 B2 * | 9/2023 | Xu | G11C 29/52 365/185.22 |
| 2007/0089032 A1 * | 4/2007 | Alexander | G06F 11/1024 714/763 |
| 2009/0187785 A1 | 7/2009 | Gonzalez et al. | |

(Continued)

FOREIGN PATENT DOCUMENTS

| KR | 10-2016-0120323 A | 10/2016 |
|---|---|---|
| KR | 10-2017-0129703 A | 11/2017 |

OTHER PUBLICATIONS

Communication issued on May 23, 2024 by the European Patent Office for European Patent Application No. 23211198.9.

*Primary Examiner* — Albert Decady
*Assistant Examiner* — Grace V Braden
(74) *Attorney, Agent, or Firm* — Sughrue Mion, PLLC

(57) ABSTRACT

A memory system, a memory controller are provided. The memory system includes: a memory device; and a memory controller configured to: control a patrol scrubbing operation in which data is read from and re-written to the memory device, based on a scrubbing cycle; and adaptively adjust the scrubbing cycle based on a comparison of an error count value of the memory device and a plurality of risk threshold values.

20 Claims, 8 Drawing Sheets

(56) References Cited

U.S. PATENT DOCUMENTS

| | | |
|---|---|---|
| 2016/0246679 A1* | 8/2016 | Kim .................. G06F 11/106 |
| 2017/0269979 A1* | 9/2017 | Gollub ................ G06F 11/076 |
| 2021/0011651 A1 | 1/2021 | Lim |
| 2021/0049078 A1 | 2/2021 | Khan et al. |
| 2022/0050748 A1 | 2/2022 | Kim et al. |

* cited by examiner

| Risk Level | Fail Status | Scrubbing Cycle |
|---|---|---|
| High | CE Count >Th | 10 |
| Mid | CE Count >10 | 5 |
| Low | CE Count >1 | 2 |

FIG. 8

| Bit Range | Default & Access | Field Name (ID): Description |
|---|---|---|
| 31:28 | 0h<br>RO | Reserved |
| ⋮ | ⋮ | ⋮ |
| 13 | 0h<br>RW/P | EN_PATSPR:<br>If en_patspr=1: Log patrol/sparing errors and NOT demand/ufill reads, If en_patspr=0: Log demand/ufill reads and NOT patrol/sparing.<br>Default is to log demand/ufill reads. |
| 12 | 0h<br>RW/V/P | PATSPR:<br>Indicates if we have logged a patrol/spare error.<br>If patspr=1 we have logged patrol/ spare error |

3000

MEMORY CONTROLLER AND MEMORY SYSTEM INCLUDING THE SAME

CROSS-REFERENCE TO RELATED APPLICATION

This application claims priority from Korean Patent Application No. 10-2022-0178620, filed on Dec. 19, 2022, in the Korean Intellectual Property Office, the disclosure of which is incorporated by reference herein in its entirety.

BACKGROUND

Technical Field

The present disclosure relates to a memory device and a memory system.

Description of Related Art

Semiconductor memory devices for storing data include volatile memory devices and non-volatile memory devices. A volatile memory device such as a Dynamic Random Access Memory (DRAM) in which data is stored by charging or discharging a cell capacitor maintains the stored data while power is applied, but loses the stored data when power is cut off. A non-volatile memory device may store data even when power is cut off. The volatile memory device may be used as a main memory of a computer, etc., and the non-volatile memory device may be used as a large capacity memory for storing programs and data in a wide range of application devices such as computers and portable communication devices.

The volatile memory devices are increasingly scaled down in accordance with needs to implement a larger memory capacity in a smaller chip. However, a memory cell having a probability of occurrence of a defect may result in a memory device having degraded performance.

BRIEF SUMMARY

One or more example embodiments provide a memory controller and a memory system in which device performance and reliability may be improved.

According to an aspect of an example embodiment, a memory system includes: a memory device; and a memory controller configured to: control a patrol scrubbing operation in which data is read from and re-written to the memory device, based on a scrubbing cycle; and adaptively adjust the scrubbing cycle based on a comparison of an error count value of the memory device and a plurality of risk threshold values.

According to an aspect of an example embodiment, a memory system includes: a plurality of memory devices; and a memory controller configured to identify a risk level based on fail information of the plurality of memory devices, set a scrubbing cycle in accordance with the risk level and control a patrol scrubbing operation to be performed at the scrubbing cycle.

According to an aspect of an example embodiment, a memory controller includes: a non-volatile memory storing fail information; and a processor configured to control; a scrubbing cycle to be set based on the fail information; and an Error Correction Code (ECC) engine to perform a scrubbing operation in which a bit error of data read from a memory device is detected and corrected, and corrected data is written in the memory device, at the scrubbing cycle.

Example embodiments are not limited to those mentioned above and additional objects of the present disclosure, which are not mentioned herein, will be clearly understood by those skilled in the art from the following description of the present disclosure.

BRIEF DESCRIPTION OF DRAWINGS

The above and other aspects and features will be more apparent from the following description of example embodiments, taken in conjunction with the accompanying drawings, in which:

FIG. 8 is a table illustrating register bits of a memory system according to some example embodiments;

DETAILED DESCRIPTION

Hereinafter, example embodiments of the disclosure will be described with reference to the attached drawings. It will be understood that, although the terms "first", "second", etc., may be used herein to describe various elements or components, these elements or components should not be limited by these terms. These terms are only used to distinguish one element or component from another element or component. Therefore, a first element or component discussed below could be termed a second element or component without departing from the technical spirits of the present disclosure.

Figure 1:
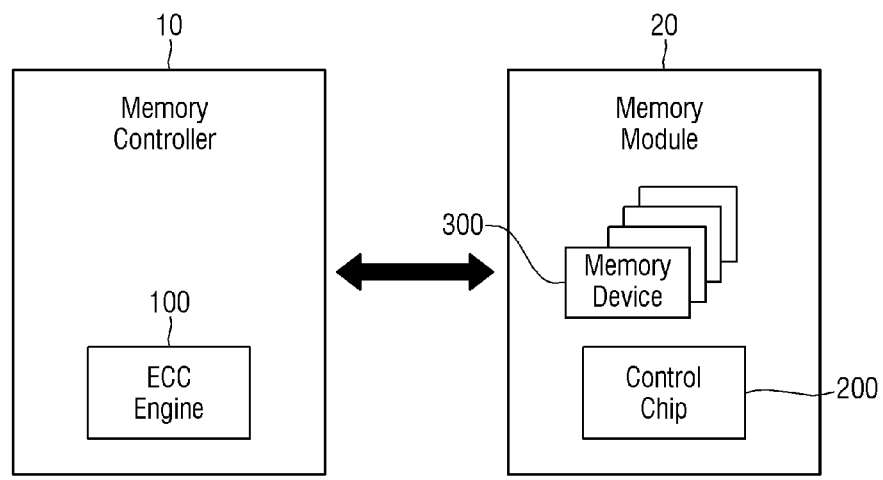
FIG. 1 is a block diagram illustrating a memory system according to some example embodiments.

FIG. 1 is a block diagram illustrating a memory system according to some example embodiments.

Referring to FIG. 1, a memory system includes a memory controller 10 and a memory module 20. Each of the memory controller 10 and the memory module 20 includes an interface for mutual communication. The interfaces may be connected to each other through a control bus for transmitting a command CMD, an address ADDR, a clock signal CLK, etc., and a data bus for transmitting data. The command CMD may include the address ADDR.

The memory controller 10 may generate a command signal CMD for controlling the memory module 20, and may write data DATA in the memory module 20 or read the data DATA from the memory module 20 under the control of the memory controller 10. In accordance with some example embodiments, the memory controller 10 may include an error correction code (ECC) engine 100.

The ECC engine 100 checks whether there is an error in data read from a memory cell and corrects the error when a bit error occurs. In accordance with some example embodiments, the ECC engine 100 may perform a patrol scrubbing operation for the memory module 20.

The memory module 20 may include a control chip 200 and a plurality of memory devices 300. The control chip 200 controls an access operation for the memory device 300. Each of the control chip 200 and the memory device 300 may be implemented in the form of an independent chip and packaged on a substrate of the memory module 20. The memory module 20 may transmit data read from the memory cell, state information of the memory device, etc., through the data bus.

Figure 2:
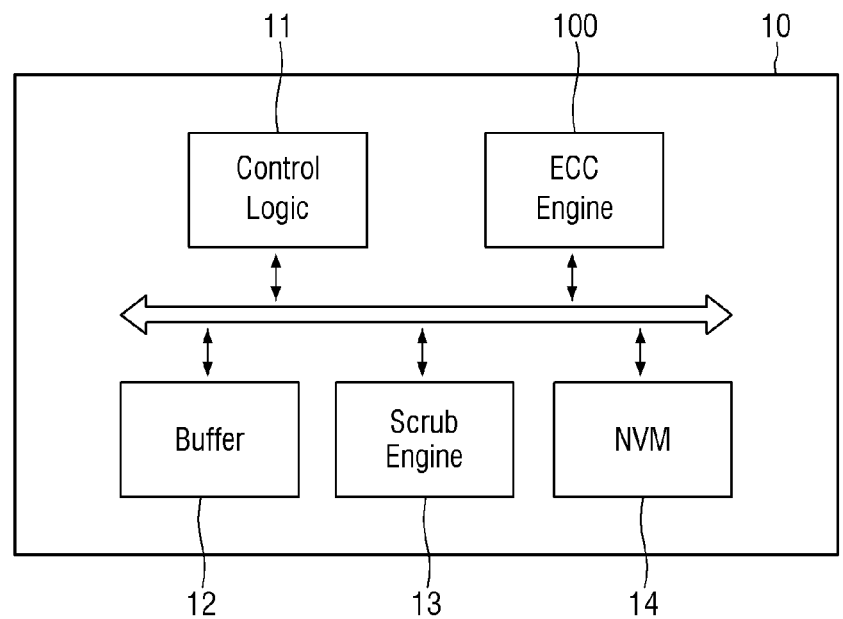
FIG. 2 is a block diagram illustrating a memory controller according to some example embodiments.

FIG. 2 is a block diagram illustrating a memory controller according to some example embodiments.

Referring to FIG. 2, when the memory controller 10 receives an access request for the memory module 20 from an external device (e.g., application processor, etc.), the memory controller 10 determines a command CMD related to the access request through a controller control logic 11. The memory controller 10 may transmit the command CMD to the memory module 20 to control the overall operation of the memory module 20. In accordance with some example embodiments, the memory controller 10 may include the controller control logic 11, an error correction engine 100, a buffer 12, a scrub engine 13 and a non-volatile memory 14, each of which may include circuitry.

The controller control logic 11 controls the overall operation of the memory controller 10. For example, the controller control logic 11 controls the operation of each of the ECC engine 100, the buffer 12, the scrub engine 13 and the non-volatile memory 14.

The ECC engine 100 may perform an error detection and correction function for read data read from the memory module 220. In more detail, the ECC engine 100 may generate parity bits with respect to write data to be written in the memory module 20, and the generated parity bits may be stored in the memory device 300 together with the write data. When data are read from the memory device 300, the ECC engine 100 may correct an error of the read data by using the read data and the parity bits read from the memory device 300, and may output the error-corrected read data.

The ECC engine 100 periodically performs a patrol scrubbing operation according to a scrubbing cycle. In the patrol scrubbing operation, data is read with respect to any one memory device 300, error correction is performed on the read data, and the read data that has been corrected is written back to the memory device 300. The scrubbing cycle may be set differently according to example embodiments.

The buffer 12 may function as a working memory for temporarily storing data to be transmitted to the memory module 20 or data received from the memory module 20.

The scrub engine 13 sets a scrubbing cycle based on fail information.

In accordance with some example embodiments, the scrubbing cycle may be any one cycle selected from a plurality of scrubbing cycles. The scrubbing cycle may be selected depending on an error level of the memory device 300. Alternatively, in accordance with some example embodiments, the scrubbing cycle may refer to a number of scrubbing times, and may be selected from a plurality of scrubbing times according to an operation state of the memory device 300. For example, the scrub engine 13 may increase an error count value whenever an error is detected in data read in accordance with a scrubbing operation in the memory device 300. The scrub engine 13 may set the scrubbing cycle based on the error count value, thereby adjusting the scrubbing cycle depending on a risk level of a range to which an error count value belongs. At this time, an error to be detected may be a correctable error.

In accordance with some example embodiments, the scrub engine 13 may store, as fail information, an address of the memory cell in which an error has been detected.

In accordance with some example embodiments, the ECC engine 100 may perform the scrubbing operation for the each of the memory devices 300. Alternatively, in accordance with some example embodiments, the ECC engine 100 may perform the scrubbing operation for some of the memory devices 300. For example, the ECC engine 100 may detect an error in a memory cell, and perform the scrubbing operation for an area (for example, block unit, bank unit or chip unit), which includes the error, based on the address of the memory cell in which the error has been detected.

As illustrated, the scrub engine 13 may be separate from the ECC engine 100, but may be implemented as being included in the ECC engine 100 in accordance with various example embodiments.

The non-volatile memory 14 may store control information or the like related to the operation of the memory system. In accordance with some example embodiments, the non-volatile memory 14 may store a plurality of scrubbing cycles according to a plurality of risk levels and a plurality of risk threshold values as scrubbing environment information. In accordance with some example embodiment, the plurality of scrubbing cycles may respectively correspond to the memory chips 300. In accordance with some example embodiments, the non-volatile memory 14 may store the control information in the form of register bits.

In accordance with some example embodiments, the non-volatile memory 14 may store environment information on the operation of the memory device 300. For example, the non-volatile memory 14 may store fail information.

Figure 3:
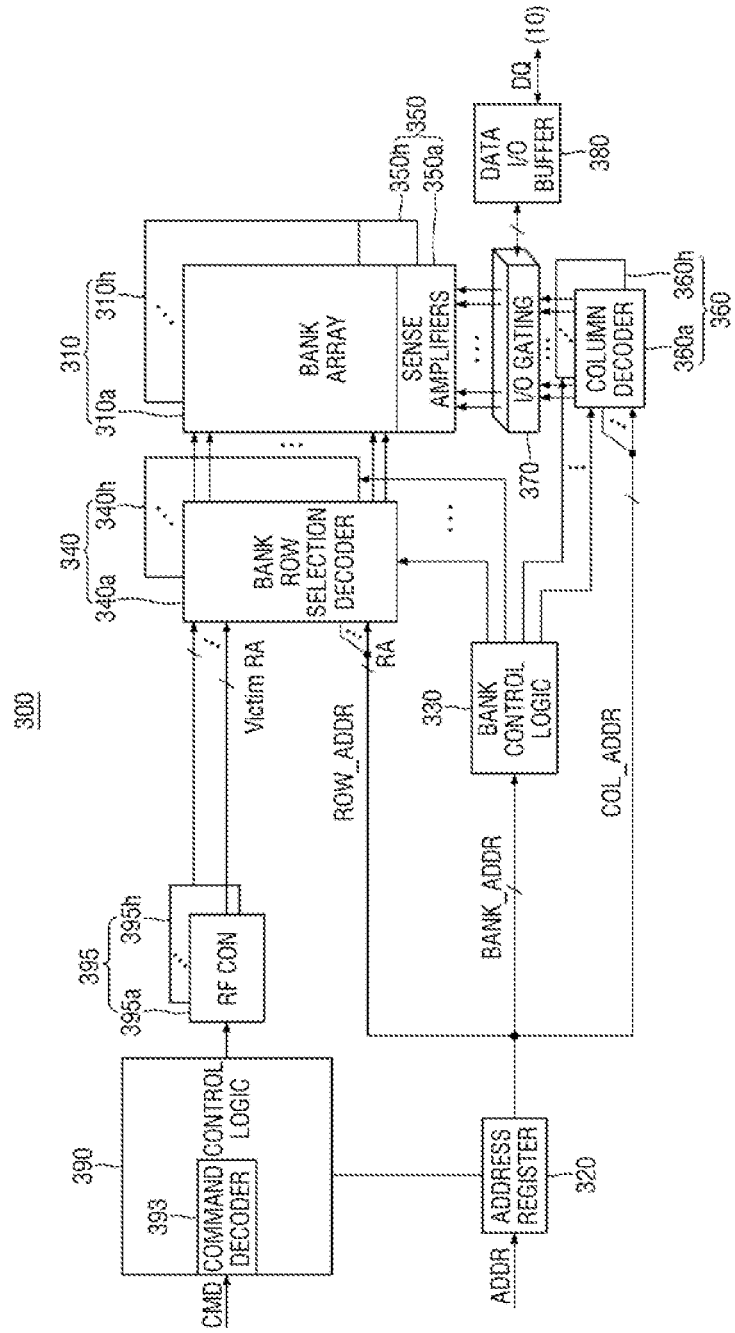
FIG. 3 is a block diagram illustrating a memory device according to some example embodiments.

FIG. 3 is a block diagram illustrating a memory device according to some example embodiments.

Referring to FIG. 3, the memory device 300 may include a memory control logic 390, an address register 320, a bank control logic 330, a row selection circuit 340, a column decoder 360, a memory cell array 310, a sense amplifier unit 350, an input/output gating circuit 370, a data input/output buffer 380 and a refresh controller 395. The memory device 300 may be one among a plurality of the memory devices 300 provided in the memory module 20.

The memory cell array 310 may include a plurality of memory banks, that is, a plurality of bank arrays 310a to 310h. The row selection circuit 340 may include a plurality of bank row selection circuits 340a to 340h respectively connected to the plurality of bank arrays 310a to 310h, the column decoder 360 may include a plurality of column decoders 360a to 360h respectively connected to the plurality of bank arrays 310a to 310h, and the sense amplifier unit 350 may include a plurality of sense amplifiers 350a to 350h respectively connected to the plurality of bank arrays 310a to 310h.

Each of the bank arrays 310a to 310h may include a plurality of blocks BLK0 to BLKn. Each block BLK may include a plurality of memory cells. The memory cell array 310 may include a plurality of memory cells. For example, the memory cell may be a Dynamic Random Access Memory (DRAM) cell. In this case, the memory interface 27 may perform communication based on one of standards such as a double data rate (DDR), a low power double data rate (LPDDR), a graphics double data rate (GDDR), a wide I/O, a high bandwidth memory (HBM) and a hybrid memory cube (HMC).

The memory device 300 may receive a command/address (C/A) signal based on a clock signal CK.

The address register 320 may receive address information ADDR from the memory controller 10. The address information ADDR may include a bank address BANK_ADDR, a row address ROW_ADDR and a column address COL_ADDR. The address register 320 may translate the address information into an internal address of the memory module 20. For example, the address register 320 may provide the bank address BANK_ADDR to the bank control logic 330, provide the row address ROW_ADDR to the row selection circuit 340 and provide the column address COL_ADDR to the column decoder 360.

The bank control logic 330 may generate bank control signals in response to the bank address BANK_ADDR. In response to the bank control signals, a bank row selection circuit, which corresponds to the bank address BANK_ADDR, among the plurality of bank row selection circuits 340a to 340h may be activated and a bank column decoder, which corresponds to the bank address BANK_ADDR, among the plurality of bank column decoders 360a to 360h may be activated.

The row address ROW_ADDR output from the address register 320 may be applied to the bank row selection circuits 340a to 340h, respectively. The bank row selection circuit, which is activated by the bank control logic 330, among the bank row selection circuits 340a to 340h may decode the row address ROW_ADDR to activate a word line corresponding to the row address, thereby applying an operation voltage. For example, the activated bank row selection circuit may apply a word line driving voltage to each row corresponding to the row address.

The column decoder 360 may include a column address latch. The column address latch may receive the column address COL_ADDR from the address register 320, and may temporarily store the received column address COL_ADDR. Also, in a burst mode, the column address latch may gradually increase the received column address COL_ADDR. The column address latch may apply the column address COL_ADDR, which is temporarily stored or gradually increased, to the bank column decoders 360a to 360h, respectively.

The bank column decoder, which is activated by the bank control logic 330, among the bank column decoders 360a to 360h may activate a sense amplifier corresponding to the bank address BANK_ADDR and the column address COL_ADDR through the input/output gating circuit 370.

The input/output gating circuit 370 may include an input data mask logic, read data latches for storing data output from the bank arrays 310a to 310h and write drivers for writing data to the bank arrays 310a to 310h, together with circuits for gating input/output data.

Data DQ to be read from one of the bank arrays 310a to 310h may be sensed by one of the sense amplifiers 350a to 350h corresponding to the one bank array and stored in the read data latches. The data DQ stored in the read data latches may be provided to the memory controller through the data input/output buffer 380. Data DQ to be written in one of the bank arrays 310a to 310h may be provided from the memory controller to the data input/output buffer 380. The data DQ provided to the data input/output buffer 380 may be written in the one bank array through the write drivers.

The refresh controller 395 may control the bank row selection circuit 340 of the memory module 20 to perform a refresh operation. In accordance with some example embodiments, the refresh controller 395 may include a plurality of refresh controllers 395a to 395h corresponding to the respective bank row selection circuits 340a to 340h.

The memory control logic 390 may control overall operations of the memory device 300. In accordance with some example embodiments, the memory control logic 390 may generate first control signals to perform an activation operation, for example, a write operation or a read operation, in the memory device 300. In accordance with some example embodiments, the memory control logic 390 may control the refresh controller 395 through a refresh controller control signal such that a refresh operation is performed in the memory device 300.

Although the refresh controller 395 and the memory control logic 390 are shown separately from each other in FIG. 3, the refresh controller 395 and the memory control logic 390 may be implemented as independent components, or the memory control logic 390 may be implemented to include a refresh controller 395 in accordance with some example embodiments.

The command decoder 393 may receive a command of command/address signals and decode the command into an internal command of the memory module 20. The command decoder 393 may decode the command CMD received from the memory controller 10 to generate the internal command. The command CMD may be a command for a data read operation, a data write operation, or a data erase operation. The command CMD may be a refresh command.

When a refresh command REF CMD is received from the memory controller 10 in accordance with some example embodiments, the memory control logic 390 may generate a refresh controller control signal for an external refresh operation. The refresh command may be a command to perform a refresh operation for at least one of a row hammer, row or a victim row.

Although the memory control logic 390 and the address register 320 are shown as separate components in FIG. 3, the memory control logic 390 and the address register 320 may be implemented as a single component. In addition, although the command CMD and the address ADDR are shown as being provided as separate signals in FIG. 3, the address may be included in the command.

Figure 4:
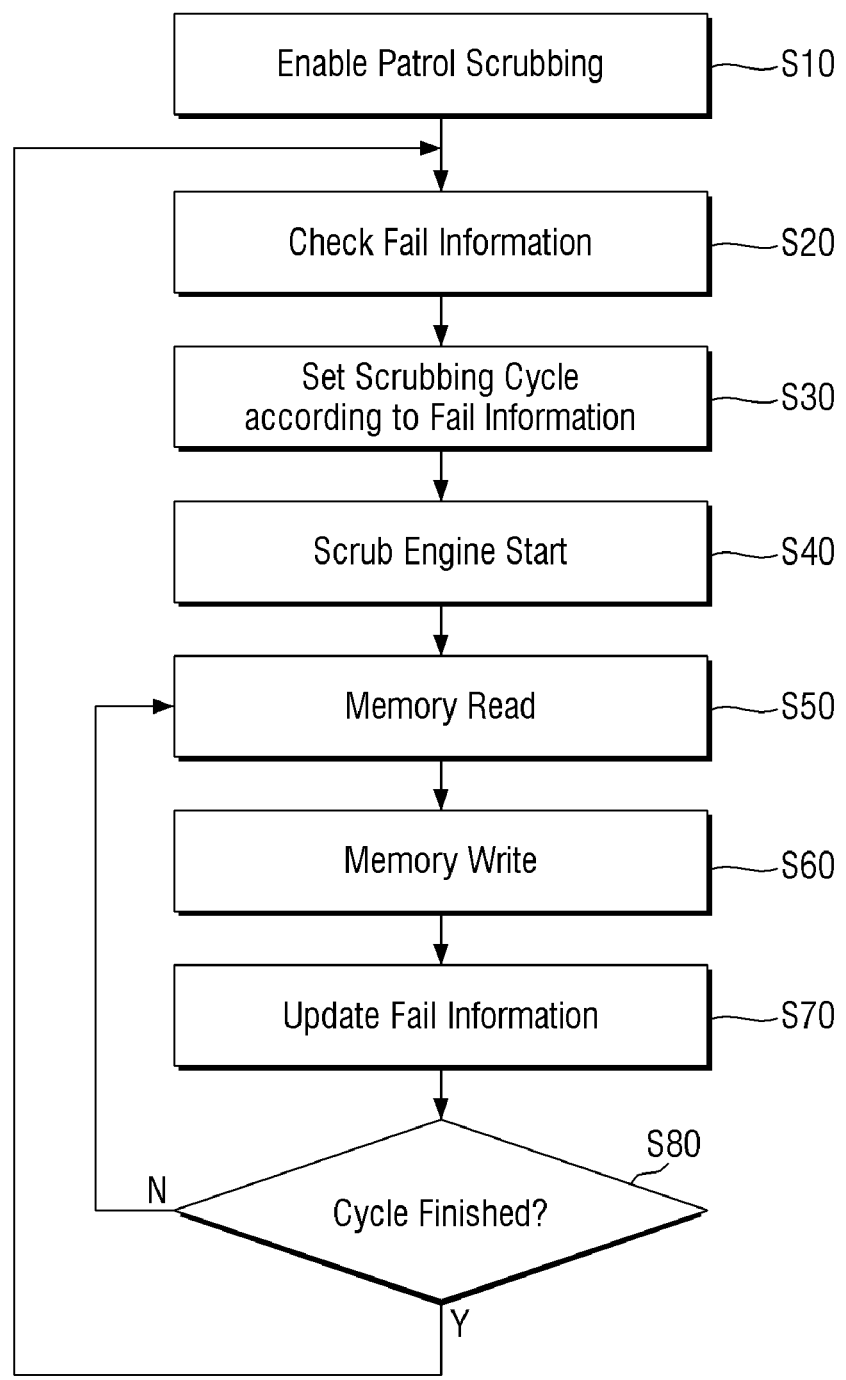
FIG. 4 is a flow chart illustrating an operation method of a memory system according to some example embodiments.

FIG. 4 is a flow chart illustrating an operation method of a memory system according to some example embodiments.

Referring to FIG. 4, the memory system performs the patrol scrubbing operation. The patrol scrubbing operation includes alternately performing a data read operation and a data write operation.

The memory controller 10 activates the scrubbing operation, for example, based on a control signal (S10). For example, when the memory module 20 receives a scrubbing enable signal, the memory module 20 may activate the patrol scrubbing operation.

The memory controller 10 checks fail information when the patrol scrubbing operation is activated (S20). In accordance with some example embodiments, the fail information includes error information monitored by the ECC engine 100. For example, the fail information may include an error count value, which is the number of times of an error that has been detected, and an address of the memory cell in which the error has been detected.

The memory controller 10 sets a scrubbing cycle based on the fail information and an operation state of the memory device (S30). The memory controller 10 includes a scrubbing cycle corresponding to each of a plurality of risk levels in accordance with some example embodiments. The plurality of risk levels may be mapped to ranges in which error information 'x' is distinguished by a plurality of risk threshold values TH1 and TH2. For example, the first risk threshold value TH1 may be smaller than the second risk threshold value TH2 (TH1<TH2). A first range corresponding to a first risk level may be from 0 to the first risk threshold value (0≤x<TH1), a second range corresponding to a second risk level may be from the first risk threshold value to the second risk threshold value (TH1≤x<TH2), and a third range corresponding to a third risk level may be greater than or equal to the second risk threshold value (TH2≤x). In accordance with some example embodiments, the memory controller 10 may include a scrubbing cycle mapped to each risk level. For example, the memory controller 10 compares an error count value 'x' of the fail information with the plurality of risk threshold values and sets a scrubbing cycle of the patrol scrubbing operation in accordance with the comparison result.

In accordance with some example embodiment, the memory controller 10 may control the scrubbing cycle depending on whether the operation state of the memory device 300 is in an active mode or an idle mode. For example, a scrubbing cycle based on the comparison result may be set in the active mode, and a preset number of idle scrubbing times may be separately set in the idle mode.

The memory controller 10 performs a scrubbing operation based on a set scrubbing cycle (S40). For example, the memory controller 10 reads data from the memory device 300 in accordance with the scrubbing cycle and writes the data (S50 and S60).

In accordance with some example embodiments, the memory controller 10 may perform the patrol scrubbing operation for a memory bank, a memory chip or a memory module, in which a memory cell of an address included in the fail information is included, based on the address included in the fail information. For example, when a first memory cell in which a correctable error occurs belongs to a first bank, the memory controller 10 may perform scrubbing only for the first bank and may not perform scrubbing for a second bank. Alternatively, when the first memory cell in which a correctable error occurs belongs to a first memory chip, the memory controller 10 may perform scrubbing only for the first memory chip and may not perform scrubbing for a second memory chip.

The memory controller 10 monitors the presence or absence of an error in the memory access operations (S50 and S60) and updates the fail information in S70. The memory controller 10 continues to update the fail information by repeating S50 to S70 in the current scrubbing cycle, and proceeds to a next scrubbing cycle (S80, Y) when the scrubbing cycle ends (S80).

Thus, the memory system may prevent an unrecoverable error from occurring in the scrubbing operation by maintaining or re-adjusting the scrubbing cycle in accordance with the fail information. Accordingly, performance drop and failure rate of the memory system may be lowered.

Figure 5:
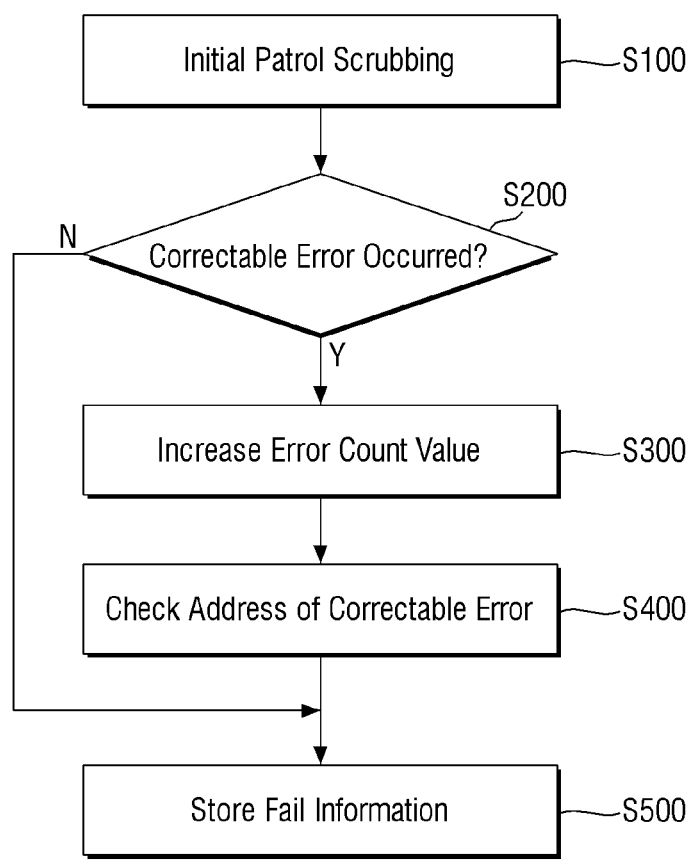
FIG. 5 is a flow chart illustrating an operating method of a memory system according to some example embodiments.

FIG. 5 is a flow chart illustrating an operating method of a memory system according to some example embodiments. An example embodiment of an operation method of a memory system during a unit scrubbing cycle of FIG. 4 is provided.

Referring to and referring to FIG. 5, when the patrol scrubbing operation is initialized and activated (S100), the memory system reads data of the memory device 300 and checks whether there is an error in the read data.

When a correctable error exists in the read data (S200, Y), the memory system increases an error count value (S300), and checks the address of the memory cell in which the error has occurred (S400). The memory system stores the error count value of S300 and the address of the memory cell of S400 as the fail information (S500).

When there is no correctable error in the read data (S200, N), the memory system maintains the existing fail information (S500).

Figures 6, 7:
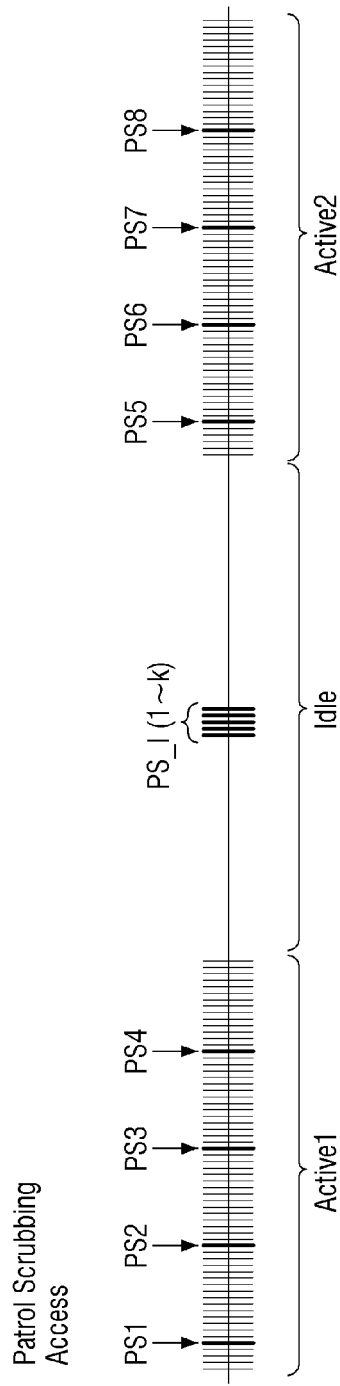
FIG. 6 is a table illustrating risk levels based on an error count according to some example embodiments.
FIG. 7 is a conceptual view illustrating a cycle of a patrol scrubbing operation of a memory system according to some example embodiments.

FIG. 6 is a table illustrating risk levels based on an error count according to some example embodiments.

One example embodiment in which a memory system determines a risk level according to fail information and adjusts a scrubbing cycle according to the risk level will be described with reference to FIG. 6.

For example, it is assumed that there are two risk thresholds. It is assumed that a first risk threshold is 10 and a second risk threshold is Th. The second risk threshold has a value greater than the first risk threshold (10<Th).

When an error count value CE Count exceeds one and is less than a first risk threshold 10, the memory system determines a risk level as Low and sets the number of scrubbing times within a unit time to two times at a low risk level. When the error count value CE Count exceeds the second risk threshold (10 times) and is less than the second risk threshold value Th, the memory system determines the risk level as Mid, and sets the number of scrubbing times within a unit time to five times at a middle risk level. When the error count value CE Count exceeds the second risk threshold Th, the memory system determines the risk level as High, and sets the number of scrubbing times within the unit time to 10 times at the high risk level.

That is, as the error count value included in the fail information is increased, the memory system may increase the number of scrubbing times within a unit time, thereby shortening the scrubbing cycle.

When the scrubbing cycle is shortened (i.e., the scrubbing operation is performed more frequently), the correctable error is easily corrected, whereby a fail occurrence rate in a normal read operation of the memory device 300 may be reduced, and performance of the memory system may be improved.

FIG. 7 is a conceptual view illustrating a cycle of a patrol scrubbing operation of a memory system according to some example embodiments.

In accordance with some example embodiments, the memory system may adjust the scrubbing cycle of the patrol scrubbing operation depending on the operation state of the memory device 300.

For example, the memory device 300 may switch between an active mode and an idle mode in accordance with the reception of the command from the memory controller 10. That is, the memory device 300 maintains an active mode Active1 during a memory access operation according to the command and switches to an idle mode when the access operation is completed. When the command is received in the idle mode, the memory device 300 switches back to an active mode Active2.

The patrol scrubbing operation PS may be performed in accordance with the scrubbing cycle adjusted as described with reference to FIG. 6 in the active mode. For example, four scrubbing operations may be performed in the active mode Active1 (PS1, PS2, PS3 and PS4), and four scrubbing operations may be performed in the active mode Active2 (PS5, PS6, PS7 and PS8).

However, in the idle mode, because the memory device 300 autonomously performs a preset background operation without a memory access operation according to an external command, the memory device 300 may perform the patrol scrubbing operation at a scrubbing cycle different from that of the active mode. As shown, in accordance with some example embodiments, the memory system may densely or intensively perform k (k being an integer greater than 1) patrol scrubbing operations (PS_I (1~k)) within a preset time in the idle mode. In this case, "densely or intensively performed" means that the scrubbing operation is not performed at a predetermined cycle throughout the entire period of the idle mode, but is performed at a preset short cycle during a partial period of the idle mode.

FIG. 8 is a table illustrating register bits of a memory system according to some example embodiments.

According to some example embodiments, a risk threshold, a risk level and a scrubbing cycle may be information set to register bits. For example, the register bits have 32 bits and are divided several bit ranges which each of bit ranges indicates special information.

For example, an area of register bits [12], PATSPR indicates that the memory system has logged a patrol scrubbing error 'patspr'. 'patspr=1' means that the memory controller 10 has logged the patrol scrubbing error. For example, an area of register bits [13], EN_PATSPR indicates enablement to log the patrol scrubbing error. When 'en_patspr=1', the memory controller 10 logs the patrol scrubbing error. When 'en_patspr=0', the memory controller 10 does not log the patrol scrubbing error. An area of register bits [31:28] is a reserved region to have user-definable information. For example, the register bits [31:28] may include a plurality of risk thresholds, a plurality of risk levels according to the risk thresholds, risk level information on a scrubbing cycle (or scrubbing times within a unit time) corresponding to the risk level or scrubbing area setting information.

The memory controller 10 may check whether the fail information is logged or not (shown in FIG. 4, S20) according to the register bit and the register bit [12]. When the fail information is logged, the memory controller 10 may compare the risk level information included in the register bits [31:28] shown in FIG. 8 with the fail information to adjust the scrubbing cycle of the patrol scrubbing operation depending on the comparison result or the operation state (shown in FIG. 4, S30).

The memory controller 10 may perform scrubbing in units of memory banks (or chips), to which an error has occurred, based on the fail information included in the register bits [31:28] shown in FIG. 8.

Figure 9:
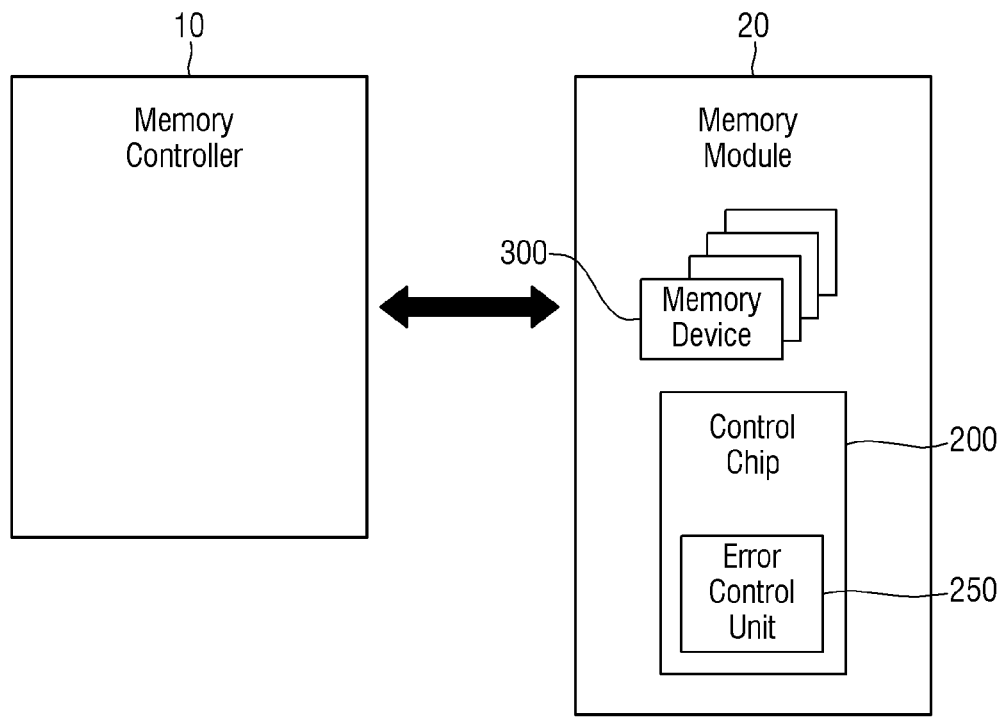
FIG. 9 is a block diagram illustrating a memory system according to some example embodiments.

FIG. 9 is a block diagram illustrating a memory system according to some example embodiments. For convenience of description, descriptions duplicated with those of FIG. 1 will be omitted.

Referring to FIG. 9, the memory system includes a memory controller 10 and a memory module 20. The memory module 20 includes a control chip 200 and a plurality of memory devices 300. The control chip 200 of the memory module 20 may include an error control unit 250. The error control unit 250 may serve as the scrub engine 13 of FIG. 2.

In accordance with some example embodiments, the error control unit 250 of FIG. 9 may perform the patrol scrubbing operation under the control of the memory controller 10. Alternatively, in accordance with some example embodiments, the error control unit 250 may autonomously perform patrol scrubbing in the memory module 20 without control of the memory controller 10.

The error control unit 250 periodically performs a patrol scrubbing operation according to a scrubbing cycle. In the patrol scrubbing operation, data is read, error correction is performed on the read data, and the read data that has been corrected is written back to the memory device 300. For example, the error control unit 250 repeatedly performs data read and write operations at a preset scrubbing cycle, and the scrubbing cycle may be differently set depending on various example embodiments.

When a bit error exists in the read data, the error control unit 250 corrects the error and writes the corrected data. The error control unit 250 may store the number of bit errors, that is, the error count value and the address of the corresponding memory cell as fail information and differently set the scrubbing cycle based on the fail information and the operation state of the memory device 300. A description related to adjustment of the scrubbing cycle is redundant with that of FIGS. 4 to 8 and thus will be omitted.

Figure 10:
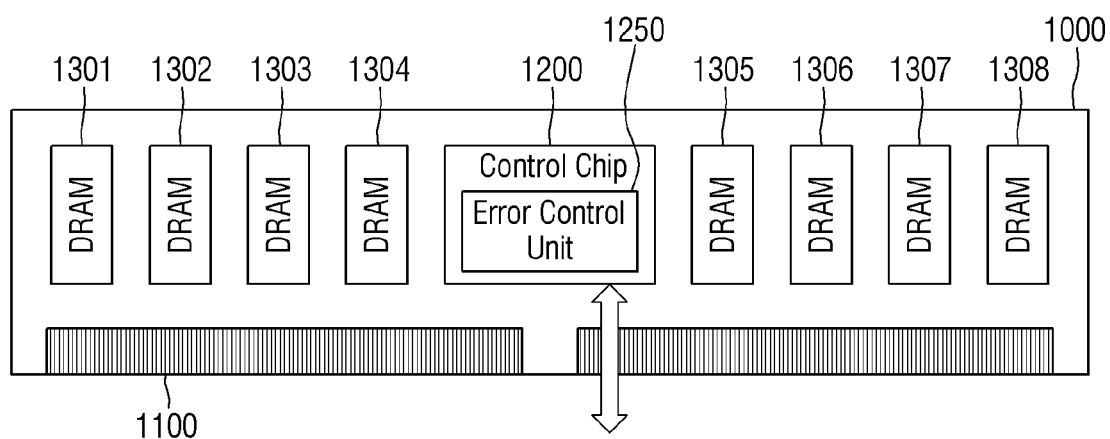
FIG. 10 is a block diagram illustrating a memory system according to some example embodiments.

FIG. 10 is a block diagram illustrating a memory system according to some example embodiments.

Referring to FIG. 10, a memory device 1000 may be mounted in an electronic device in the form of a memory module in accordance with some example embodiments. At least one memory device 1000 may be mounted on the memory device 1000.

The memory device 1000 may include a plurality of volatile memories 1301 to 1308, a control chip 1200 and memory input/output pins 1100. The memory device 1000 may write data or output the written data under the control of an external CPU.

When the memory device 1000 includes DRAMs 1301 to 1308, the CPU may control the memory device 1000 in accordance with a communication protocol such as a Double Data Rate (DDR) and a Low Power DDR (LPDDR). For example, in order to read the data stored in the memory device 1000, the CPU transmits a command and an address to the memory device 1000.

The control chip 1200 may include an error control unit 1250. The error control unit 1250 may be the error control unit 250 described in FIG. 9.

The plurality of volatile memories 1301 to 1308 may be at least one of Dynamic Random Access Memories (DRAMs) or SDRAMs in accordance with some example embodiments. Each of the plurality of volatile memories 1301 to 1308 may communicate data DQ in response to a signal provided from the control chip 1200. In accordance with some example embodiments, the memory device 1000 may further include data buffers for data communication, and the data buffers may exchange data with the control chip 1200 in synchronization with data strobe signals DQS.

The control chip 1200 may perform communication with the plurality of volatile memories 1301 to 1308 in accordance with one of standards of a memory module such as a Dual In-Line Memory Module (DIMM), a Registered DIMM (RDIMM), a Load Reduced DIMM (LRDIMM) and a UDIMM in accordance with some example embodiments.

The control chip 1200 may receive a command/address CA and a clock signal CK of the memory device 1000 through the memory input/output pins 1100 and provide the received signals to the plurality of volatile memory devices 1301 to 1308 in accordance with some example embodiments.

Figure 11:
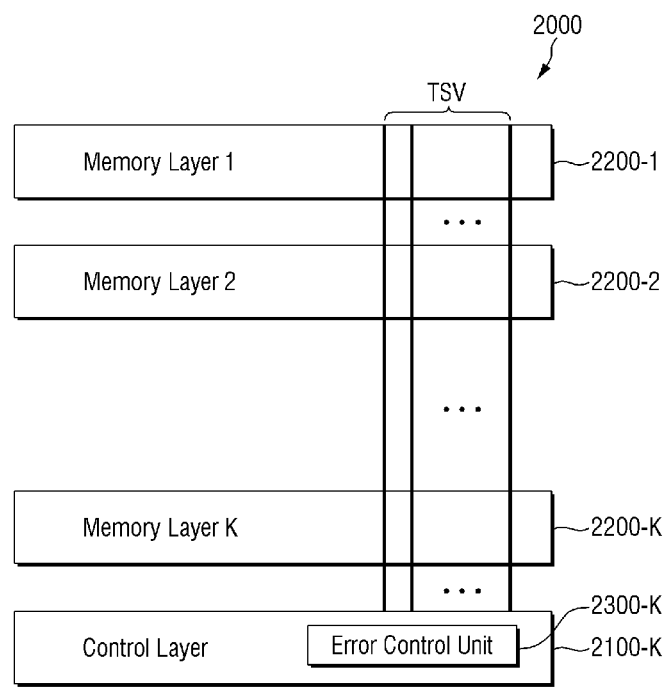
FIG. 11 is a block diagram illustrating a memory system according to some example embodiments.

FIG. 11 is a block diagram illustrating a memory system according to some example embodiments.

Referring to FIG. 11, a memory system 2000 may be implemented as a stacked memory module that includes a plurality of memory layers 2200-1 to 2200-K. The memory system 2000 may include a control layer 2100 and a plurality of memory layers 2200-K to 2200-1 stacked on the control layer 2100.

The memory devices 300 of FIG. 1 may be respectively implemented as the memory layers 2200-K to 2200-1, and the memory controller 10 of FIG. 1 may be implemented as the control layer 2100. Command or data transmission with each memory layer may be performed through a through electrode TSV.

The control layer 2100 may control the operation of the memory layers 2200-K to 2200-1, and may include an error control unit 2300 in accordance with some example embodiments.

However, example embodiments are not limited thereto, and the memory system 2000 may be implemented to include a control logic for performing a function of a control layer in each memory layer 2200 without separately including the control layer 2100. In this case, the error control unit 2300 may be included in the control logic of each memory layer.

Figure 12:
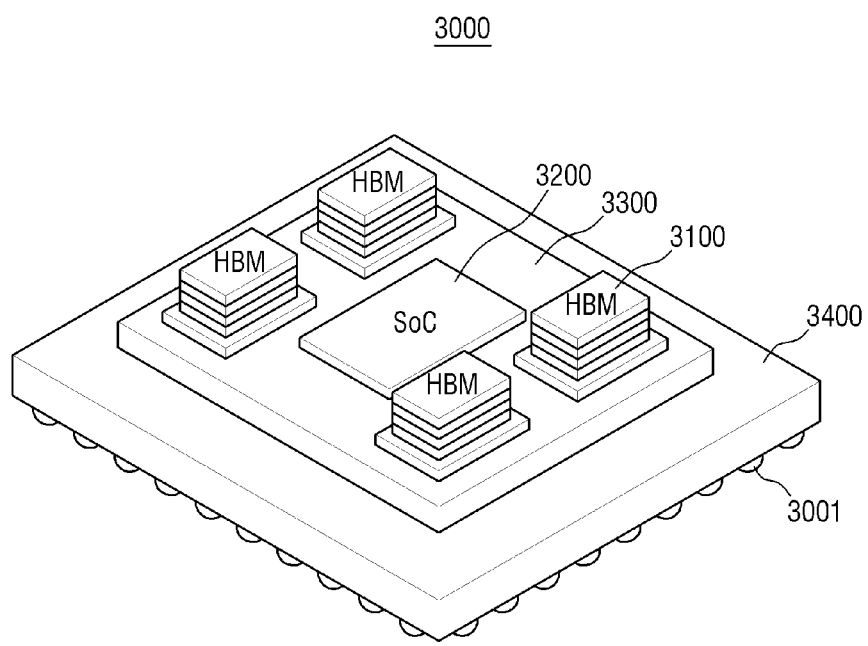
FIG. 12 is a block diagram illustrating a memory system according to some example embodiments.

FIG. 12 is a block diagram illustrating a memory system according to some example embodiments.

Referring to FIG. 12, a semiconductor package 3000 may include a plurality of stacked memory devices 3100 and a system on chip 3200. The stacked memory devices 3100 and the system on chip 3200 may be stacked on an interposer 3300, and the interposer 3300 may be stacked on a package substrate 3400. The semiconductor package 3000 may transmit and receive signals to and from another external package or semiconductor devices through a solder ball 3001 attached to a lower portion of the package substrate 3400.

Each of the stacked memory devices 3100 may be implemented based on the HBM standard, but the present disclosure is not limited thereto, and each of the stacked memory devices 3100 may be implemented based on the GDDR, HMC or Wide I/O standard. Each of the stacked memory devices 3100 may correspond to the stacked memory device 2000 of FIG. 11.

The system on chip 3200 may include at least one processor such as a CPU, an AP, a GPU and an NPU and a plurality of memory controllers for controlling the plurality of stacked memory devices 3100. The system on chip 3200 may transmit and receive signals to and from a corresponding stacked memory device through the memory controller.

In some example embodiments, each of the components represented by a block as illustrated in FIGS. 1-3 and 9-12 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A memory system comprising:
   a memory device; and
   a memory controller configured to:
      control a patrol scrubbing operation in which data is read from and re-written to the memory device, based on a scrubbing cycle;
      compare an error count value of the memory device with a plurality of risk threshold values to identify a range, from among a plurality of ranges, comprising the error count value; and
      set the scrubbing cycle to an updated scrubbing cycle, from among a plurality of scrubbing cycles, that is associated with the range,
   wherein the plurality of scrubbing cycles comprise a first scrubbing cycle associated with a first range between zero and a first risk threshold value, and a second scrubbing cycle associated with a second range between the first risk threshold value and a second risk threshold value.

2. The memory system of claim 1, wherein the error count value indicates a number of correctable errors that have occurred in the memory device.

3. The memory system of claim 2, wherein the memory controller is further configured to:
   increase the error count value based on a correctable error being detected by the patrol scrubbing operation;
   identify an address of a memory cell in which the correctable error has been detected; and
   update fail information based on the error count value and the address.

4. The memory system of claim 3, wherein the memory controller is further configured to control the patrol scrubbing operation to be performed for memory cells adjacent to the address.

5. The memory system of claim 1, wherein the plurality of scrubbing cycles are stored as register bits, and
   wherein the register bits indicate the plurality of risk threshold values.

6. The memory system of claim 1, wherein the plurality of scrubbing cycles are stored as register bits,
   wherein the register bits indicate the first scrubbing cycle associated with the first range and the second scrubbing cycle associated with the second range,
   wherein the second scrubbing cycle is shorter than the first scrubbing cycle, and
   wherein the memory controller further configured to set the scrubbing cycle to:
      the first scrubbing cycle based on the first range comprising the error count value; and
      the second scrubbing cycle based on the second range comprising the error count value.

7. The memory system of claim 1, wherein the memory controller is further configured to, based on the memory device being in an active state, control the patrol scrubbing operation to be performed at the scrubbing cycle.

8. The memory system of claim 7, wherein the memory controller is further configured to, based on the memory device being in an idle state, perform the patrol scrubbing operation at a preset idle scrubbing cycle.

9. A memory system comprising:
a plurality of memory devices; and
a memory controller configured to identify a risk level based on fail information of the plurality of memory devices, identify a scrubbing cycle, from among a plurality of scrubbing cycles, that is associated with the risk level, and control a patrol scrubbing operation to be performed at the scrubbing cycle,
wherein the plurality of scrubbing cycles comprise a first scrubbing cycle associated with a first range between zero and a first risk threshold value, and a second scrubbing cycle associated with a second range between the first risk threshold value and a second risk threshold value.

10. The memory system of claim 9, wherein the memory controller is further configured to control the patrol scrubbing operation to be performed at the scrubbing cycle or an idle scrubbing cycle based on an operation state of the plurality of memory devices.

11. The memory system of claim 10, wherein the memory controller is further configured to perform the patrol scrubbing operation at least two times within a set time period based on the plurality of memory devices being in an idle state.

12. The memory system of claim 9, wherein the memory controller is further configured to:
read data from each of the plurality of memory devices;
increase an error count value based on a correctable error being detected in the data read from the plurality of memory devices; and
update the fail information based on the error count value and an address of a memory cell corresponding to the correctable error.

13. The memory system of claim 12, wherein the plurality of scrubbing cycles are stored as register bits, and
wherein the register bits indicate a first risk level associated with the first range and a second risk level associated with the second range, and
wherein the memory controller is further configured to:
identify the risk level as the first risk level based on the first range comprising the error count value; and
identify the risk level as the second risk level based on the second range comprising the error count value.

14. The memory system of claim 13, wherein the memory controller is further configured to:
set the scrubbing cycle to the first scrubbing cycle based on the first range comprising the error count value; and
set the scrubbing cycle to the second scrubbing cycle based on the second range comprising the error count value.

15. The memory system of claim 12, wherein the memory controller is further configured to control the patrol scrubbing operation for a memory chip corresponding to the address at the scrubbing cycle.

16. A memory controller comprising:
a non-volatile memory storing fail information; and
a processor configured to control:
a scrubbing cycle, from among a plurality of scrubbing cycles, to be set based on the fail information; and
an Error Correction Code (ECC) engine to perform a scrubbing operation in which a bit error of data read from a memory device is detected and corrected, and corrected data is written in the memory device, at the scrubbing cycle,
wherein the plurality of scrubbing cycles comprise a first scrubbing cycle associated with a first range between zero and a first risk threshold value, and a second scrubbing cycle associated with a second range between the first risk threshold value and a second risk threshold value.

17. The memory controller of claim 16, wherein the processor is further configured to:
increase an error count value based on the bit error being detected; and
update the fail information based on increase of the error count value.

18. The memory controller of claim 17, wherein the plurality of scrubbing cycles are stored as register bits,
wherein the register bits indicate a first risk level associated with the first range and a second risk level associated with the second range, and
wherein the processor is further configured to:
identify a risk level as the first risk level based on the first range comprising the error count value;
identify the risk level as the second risk level based on the second range comprising the error count value; and
set the scrubbing cycle corresponding to the risk level.

19. The memory controller of claim 18, wherein the register bits indicate a plurality of risk threshold values, and a plurality of risk levels,
wherein the plurality of risk threshold values comprise the first risk threshold value and the second risk threshold value, and
wherein the plurality of risk levels comprise the first risk level and the second risk level.

20. The memory controller of claim 17, wherein the fail information indicates an address of a memory cell in which the bit error is detected.

* * * * *